(12) United States Patent
Kirsch et al.

(10) Patent No.: US 9,565,040 B2
(45) Date of Patent: Feb. 7, 2017

(54) EMPIRICAL MODE DECOMPOSITION FOR SPECTRUM SENSING IN COMMUNICATION SYSTEMS

(71) Applicant: The University of New Hampshire, Durham, NH (US)

(72) Inventors: Nicholas J. Kirsch, Portsmouth, NH (US); Mahdi H. Al-Badwari, Durham, NH (US)

(73) Assignee: The University of New Hampshire, Durham, NH (US)

( * ) Notice: Subject to any disclaimer, the term of this patent is extended or adjusted under 35 U.S.C. 154(b) by 0 days.

(21) Appl. No.: 14/789,398

(22) Filed: Jul. 1, 2015

(65) Prior Publication Data

US 2016/0028568 A1 Jan. 28, 2016

Related U.S. Application Data

(60) Provisional application No. 62/019,593, filed on Jul. 1, 2014.

(51) Int. Cl.
*G06F 17/00* (2006.01)
*H04L 27/00* (2006.01)

(52) U.S. Cl.
CPC ................. *H04L 27/0006* (2013.01)

(58) Field of Classification Search
CPC .................................. H04L 27/0006
See application file for complete search history.

(56) References Cited

U.S. PATENT DOCUMENTS

| 6,782,124 | B2 | 8/2004 | Gloersen |
| 7,710,919 | B2 | 5/2010 | Woo et al. |
| 7,768,252 | B2 | 8/2010 | Park et al. |
| 8,140,017 | B2 | 3/2012 | Shi et al. |
| 8,315,645 | B2 | 11/2012 | Zhou et al. |
| 8,442,440 | B2 | 5/2013 | Memik et al. |
| 8,442,567 | B2 | 5/2013 | Li et al. |
| 2003/0033094 | A1 | 2/2003 | Huang |
| 2007/0030002 | A1* | 2/2007 | Frei .......................... G06F 17/14 324/309 |
| 2008/0261639 | A1 | 10/2008 | Sun et al. |
| 2009/0016293 | A1 | 1/2009 | Kang et al. |
| 2009/0116595 | A1* | 5/2009 | Senroy .................. G06F 17/141 375/350 |
| 2009/0326419 | A1* | 12/2009 | Gonzalez Rojas .. A61B 5/1101 600/587 |

(Continued)

FOREIGN PATENT DOCUMENTS

| CN | 102387099 | 3/2012 |
| CN | 103338458 | 10/2013 |

OTHER PUBLICATIONS

International Search Report and Written Opinion mailed Sep. 30, 2015 in corresponding PCT Patent Application No. PCT/US15/38803.

*Primary Examiner* — Dac Ha
(74) *Attorney, Agent, or Firm* — Grossman, Tucker, Perreault & Pfleger, PLLC (57) ABSTRACT

A system and method using an Empirical Mode Decomposition (EMD)-based energy detector for spectrum sensing in a communication system. The EMD energy detector needs no prior information of the received signal, has relatively low computational complexity, operates on non-stationary and non-linear signals, and performs well at low SNR.

16 Claims, 6 Drawing Sheets

(56) References Cited

U.S. PATENT DOCUMENTS

| | | | | |
|---|---|---|---|---|
| 2010/0074496 | A1* | 3/2010 | Pao | G06T 7/0012 |
| | | | | 382/131 |
| 2010/0309317 | A1* | 12/2010 | Wu | H04W 16/14 |
| | | | | 348/180 |
| 2011/0299417 | A1* | 12/2011 | Nanda | H04W 72/02 |
| | | | | 370/252 |
| 2012/0142382 | A1* | 6/2012 | Stanforth | G06Q 10/063 |
| | | | | 455/500 |
| 2012/0282942 | A1* | 11/2012 | Uusitalo | H04W 16/14 |
| | | | | 455/452.2 |
| 2013/0165051 | A9 | 6/2013 | Li et al. | |
| 2013/0301622 | A1 | 11/2013 | Bahl et al. | |
| 2013/0336364 | A1 | 12/2013 | Kruglick | |
| 2014/0064114 | A1 | 3/2014 | Wang et al. | |
| 2015/0181436 | A1* | 6/2015 | Kathuria | H04W 16/14 |
| | | | | 455/509 |
| 2015/0189682 | A1* | 7/2015 | Carbajal | H04W 24/08 |
| | | | | 455/509 |

* cited by examiner

EMPIRICAL MODE DECOMPOSITION FOR SPECTRUM SENSING IN COMMUNICATION SYSTEMS

CROSS REFERENCE TO RELATED APPLICATION

The present application claims the benefit of the filing date of U.S. Provisional Application Ser. No. 62/019,593, filed Jul. 1, 2014, the entire teachings of which are hereby incorporated herein by reference.

TECHNICAL FIELD

The present disclosure relates to communication of information, and more particularly, to a system and method using empirical mode decomposition for spectrum sensing in communication systems.

BACKGROUND

Communication systems generally provide information carrying signals on associated frequencies or wavelengths. Some portions of a bandwidth of interest may carry information signals (i.e. the occupied spectrum) and portions of a bandwidth of interest may not carry information signals (i.e. the available spectrum or "white spaces"). In such systems, it may be useful to identify the available spectrum to identify which frequencies or wavelengths could support additional information signals. Alternatively, it may be useful identify which portions of a bandwidth of interest are inappropriately occupied by information carrying signals, e.g. a portion of expected available spectrum is being used without authorization.

One example of a communication system wherein identifying available spectrum is useful is a cognitive radio system. Cognitive radio is a form of wireless communication that can automatically change its transmission and/or reception parameters to use the available spectrum for communication while avoiding the occupied spectrum. Cognitive radio thus optimizes the use of available spectrum while minimizing interference to users of the occupied spectrum.

Cognitive radio may be used in a variety of applications. For example, the Institute of Electrical and Electronics Engineers (IEEE) has established IEEE 802.22 as a standard for wireless regional area network (WRAN) using white spaces in the television (TV) frequency spectrum. The IEEE 802.22 WRAN standard is aimed at using cognitive radio to allow sharing of geographically available spectrum allocated to TV broadcast. IEEE 802.22 WRANs are designed to operate in the TV broadcast bands while assuring that no harmful interference is caused to the incumbent operation, e.g. in digital and analog TV broadcasting, and may be used, for example, to bring broadband access to hard-to-reach, low population density areas.

In systems configured to identify the occupied and/or available spectrum the technique used for spectrum sensing is an important aspect of the system. Several spectrum sensing techniques are known, each of which has advantages and disadvantages. These techniques range from low to high computation complexity and have various levels of performance in determining the presence of signals in noise.

BRIEF DESCRIPTION OF THE DRAWINGS

Reference should be made to the following detailed description which should be read in conjunction with the following figures, wherein like numerals represent like parts.

DETAILED DESCRIPTION

In general, a system consistent with the present disclosure uses an Empirical Mode Decomposition (EMD)-based energy detector for spectrum sensing in a communication system. The EMD-based energy detector needs no prior information of the received signal, has relatively low computational complexity, operates on non-stationary and non-linear signals, and performs well at low SNR.

Example embodiments of systems and methods consistent with the present disclosure may be described herein in connection with a cognitive radio system. It is to be understood, however, that a system and method consistent with the present disclosure may be used in any type of communication system, e.g. an electrical, optical and/or wireless system. The example embodiments described herein are thus provided only by way of illustration, not of limitation.

Figure 1:
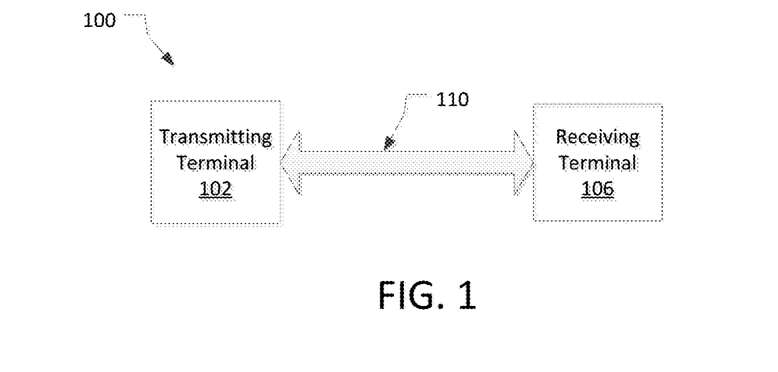
FIG. 1 is a block diagram of one exemplary embodiment of a system consistent with the present disclosure.

FIG. 1 is a simplified block diagram of one example embodiment of a communication system 100 consistent with the present disclosure. Those skilled in the art will recognize that the system 100 has been depicted as a highly simplified point-to-point system for ease of explanation. The system 100 includes transmitting terminal 102 and a receiving terminal 106 for transmitting and receiving signals over a communication path 110. The communication path 110 may include any medium for carrying signals from the transmitting terminal 102 to the receiving terminal. For example, the communication path may include one or more electrical cables, optical cables and/or the path may be a wireless path. If the path 110 is a wireless path, the transmitting terminal 102 and the receiving terminal 106 may include associated antennas (not shown) for transmitting and receiving wireless signals. Although the system is shown as communicating signals from the transmitting terminal 102 to the receiving terminal 106, the transmitting terminal 102 and receiving terminal 106 may both be configured as transceivers to allow bi-directional communication therebetween. In general, the receiving terminal 106 may include an EMD-based energy detector consistent with the present disclosure for detecting occupied and/or available spectral portions of a bandwidth of interest.

As used herein, the term "available" when used to describe spectrum or bandwidth shall refer to spectral portions of the bandwidth of interest that are not carrying information signals, and the term "occupied" when used to describe spectrum or bandwidth shall refer to spectral portions of the bandwidth of interest that are carrying information signals.

When the system 100 is configured as a cognitive radio system, it may be configured for close range or long range wireless communication between the transmitting terminal and the receiving terminal 102, 106. The term, "close range communication" is used herein to refer to systems and methods for wirelessly sending/receiving data signals between devices that are relatively close to one another. Close range communication includes, for example, communication between devices using a BLUETOOTH™ network, a personal area network (PAN), near field communication, ZigBee networks, an Wireless Display connections, millimeter wave communication, ultra high frequency (UHF) communication, combinations thereof, and the like. Close range communication may therefore be understood as enabling direct communication between devices, without the need for intervening hardware/systems such as routers, cell towers, internet service providers, and the like.

In contrast, the term "long range communication" is used herein to refer to systems and methods for wirelessly sending/receiving data signals between devices that are a significant distance away from one another. Long range communication includes, for example, communication between devices using Wi-Fi, a wide area network (WAN) (including but not limited to a cell phone network), the Internet, a global positioning system (GPS), a whitespace network such as an IEEE 802.22 WRAN, combinations thereof and the like. Long range communication may therefore be understood as enabling communication between devices through the use of intervening hardware/systems such as routers, cell towers, whitespace towers, internet service providers, combinations thereof, and the like.

Figure 2A:
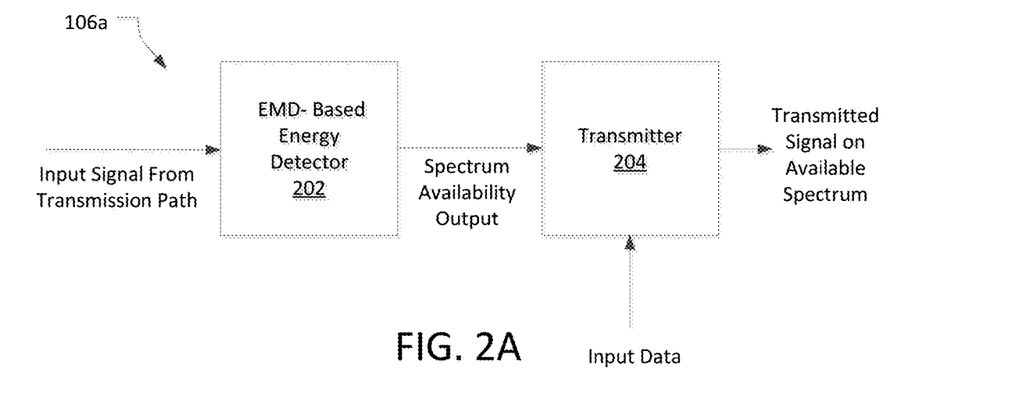
FIG. 2A is a block diagram of one exemplary embodiment of a receiving terminal consistent with the present disclosure.
Figure 2B:
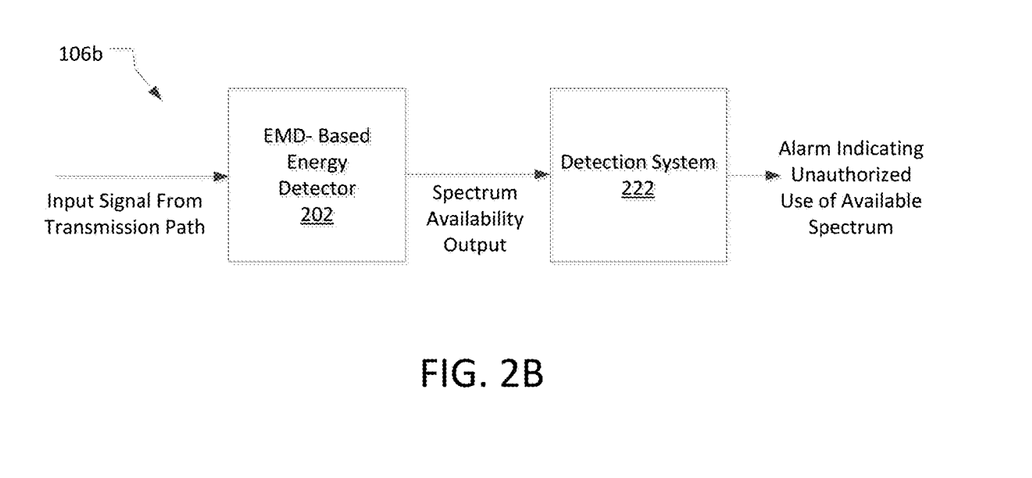
FIG. 2B is a block diagram of another exemplary embodiment of a receiving terminal consistent with the present disclosure.

FIGS. 2A and 2B are block diagrams of example embodiments 106a, 106b, respectively, of a receiving terminal 106 (FIG. 1) consistent with the present disclosure. The block diagrams in FIGS. 2A and 2B are shown in highly simplified form for ease of explanation. Those skilled in the art will recognize that a receiving terminal consistent with the present disclosure may include known configurations of other components, e.g. a power supply, data modulation components, transmission components, etc. configured for receiving data signals of a particular type depending on the application.

The embodiment 106a illustrated in FIG. 2A includes an EMD-based energy detector 202 consistent with the present disclosure coupled to a transmitter 204, such as a cognitive radio system. In general, the EMD-based energy detector 202 receives an input signal from the transmission path 110 (FIG. 1), and uses an EMD-based energy detection process to provide a spectrum availability output to the transmitter 204. The spectrum availability output indicates which portions of a bandwidth of interest are available for use (i.e. are whitespaces) by the transmitter 204 for communicating information signals.

The transmitter 204 uses the spectrum availability output to identify available spectrum and may transmit signals on the available spectrum. In an embodiment wherein the transmitter 204 is a cognitive radio system, for example, the transmitter 204 may be configured to receive input data from a data source (not shown) and transmit a signal or signals on available spectrum in response to the spectrum availability output from the EMD-based energy detector 202. A variety of configurations of the transmitter 204 that may be configured for transmitting a signal on available spectrum in response to the spectrum availability output of the EMD-based energy detector 202 are known to those of ordinary skill in the art.

The embodiment 106b illustrated in FIG. 2B includes an EMD-based energy detector 202 consistent with the present disclosure coupled to a detection system 222. As described in connection with FIG. 2A, the EMD-based energy detector 202 receives an input signal from the transmission path 110 (FIG. 1), and uses an EMD-based energy detection process to provide a spectrum availability output. The detection system 222 uses the spectrum availability output to determine portions of a bandwidth of interest that are inappropriately carrying information signals.

For example, the detection system 222 may be configured to use the spectrum availability output to identify the available spectrum in the bandwidth of interest. The detection system 222 may then compare the available spectrum to an expected available spectrum to determine the extent to which the available spectrum in the bandwidth of interest differs from the expected available spectrum. Differences between the available spectrum and the expected available spectrum may indicate that portions of the available spectrum are carrying information signals when they should not be carrying information signals, e.g. there is unauthorized use of frequencies or wavelengths within the bandwidth of interest. The detection system 222 may provide an alarm output to indicate intentional or unintentional unauthorized use of the available spectrum.

Figure 3:
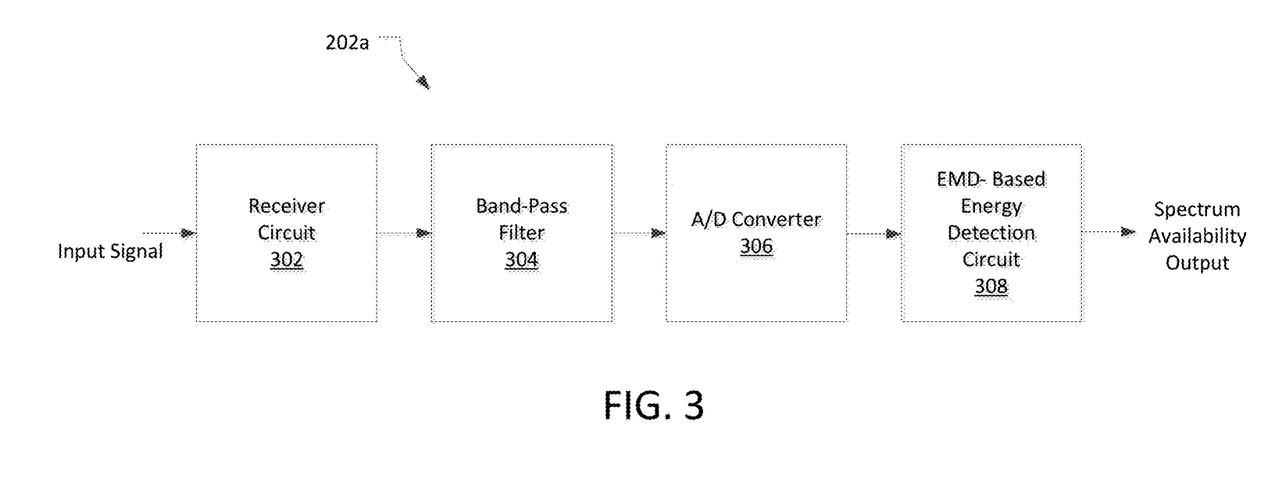
FIG. 3 is a block diagram of one exemplary embodiment of an EMD-based energy detector consistent with the present disclosure.

The EMD-based energy detector 202 may be provided in a variety of configurations. One example embodiment 202a of an EMD-based energy detector consistent with the present disclosure is illustrated in FIG. 3. The EMD-based energy detector 202a includes a receiver circuit 302, a band-pass filter 304, an analog-to-digital (A/D) converter 306, and an EMD-based energy detection circuit 308.

The receiver circuit 302 may be a known circuit configured for receiving an input signal from the communication path 110, e.g. directly from the path or from an antenna if the signal is a wireless signal, and providing an analog output signal representative of the received input signal. The analog output of the receiver circuit 302 is coupled to the band-pass filter 304. The band-pass filter 304 may take a known fixed or tunable configuration for receiving the analog output of the receiver 302 and passing only portion of the bandwidth of the analog output, i.e. a bandwidth of interest, to the A/D converter 306. For example, if the receiver 202a is intended for use in a cognitive radio system using an IEEE 802.22 WRAN, the band-pass filter 304 may be configured to pass only a portion of the analog signal within the dedicated TV band specified by IEEE 802.22. The A/D converter 306 may be configured to oversample (e.g. 10 times the highest frequency) the output band-pass filter 304 to provide a digital output representative of the output of the band-pass filter 304. A variety of A/D converter configurations useful as the A/D converter 306 are well known.

The digital output of the A/D converter 306 is coupled as an input signal to the EMD-based energy detection circuit 308. The EMD-based energy detection circuit 308 receives the digital output of the A/D converter 306 and provides a spectrum availability output indicating the available spectrum in the bandwidth of interest. The EMD-based energy detection circuit 308 implements an EMD process consistent with the present disclosure to provide spectrum availability output and may take a variety of configurations. For example, the EMD-based energy detection circuit 308 may be implemented as a field programmable gate array (FPGA) and/or using digital signal processing (DSP). As is known, DSP involves processing of signals using one or more application specific integrated circuits (ASICS) and/or special purpose processors configured for performing specific instruction sequences, e.g. directly and/or under the control of software instructions.

In general, the EMD-based energy detection circuit 308 provides the spectrum availability output by using EMD to determine frequency-domain intrinsic mode functions (IMFs). The occupied spectrum may be differentiated from available spectrum, which is occupied only by noise, using the nature of IMFs. The IMFs may be de-noised, and a data-driven threshold is calculated using the IMFs. Detection of the available spectrum is performed using the data-driven threshold.

EMD is a known non-linear decomposition process utilized to analyze and represent non-stationary real world signals. In general, EMD decomposes a time series signal into the IMFs, which are simple harmonic functions collected through an iterative process. The iterative procedure eliminates most of the signal anomalies and makes the signal wave profile more symmetric. This enables further processing to decompose the bandwidth of interest. The frequency content embedded in the processed IMFs reflects the physical meaning of the underlying frequencies.

Figure 4:
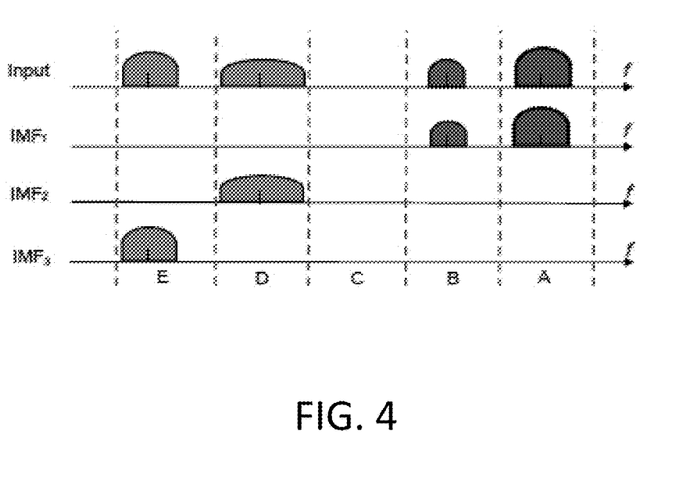
FIG. 4 diagrammatically illustrates operation of an EMD process consistent with the present disclosure.

FIG. 4, for example, diagrammatically illustrates relative power vs. frequency for an input signal occupying various bands and IMFs obtained from the input signal using EMD to show that EMD may be used to determine whether a particular spectral band (or channel) is occupied or available. In the example of FIG. 4, data signals on occupied portions of the bandwidth are restricted to associated channels A, B, C, D or E, but the input signal is provided according to a channel plan including only channels A, B, D and E, i.e. channel C is available. In an EMD process, given an input signal with the frequency spectrum shown in FIG. 4, the IMFs of the input signal may be decomposed as $IMF_1$, $IMF_2$ and $IMF_3$, which are diagrammatically illustrated beneath the input signal in FIG. 4. Relative power exceeding some threshold in any channel of an IMF indicates that the channel is occupied. Relative power that does not exceed the threshold in any channel of an IMF indicates that the channel is available. In FIG. 4, $IMF_1$ shows that channels A and B are occupied and channels C, D and E are available. $IMF_2$ shows that channel D is occupied and $IMF_3$ shows that channel E is occupied. Thus, by combining the energies of each IMF, i.e. $IMF_1$, $IMF_2$ and $IMF_3$, channel C is determined to be available for use.

Figure 5:
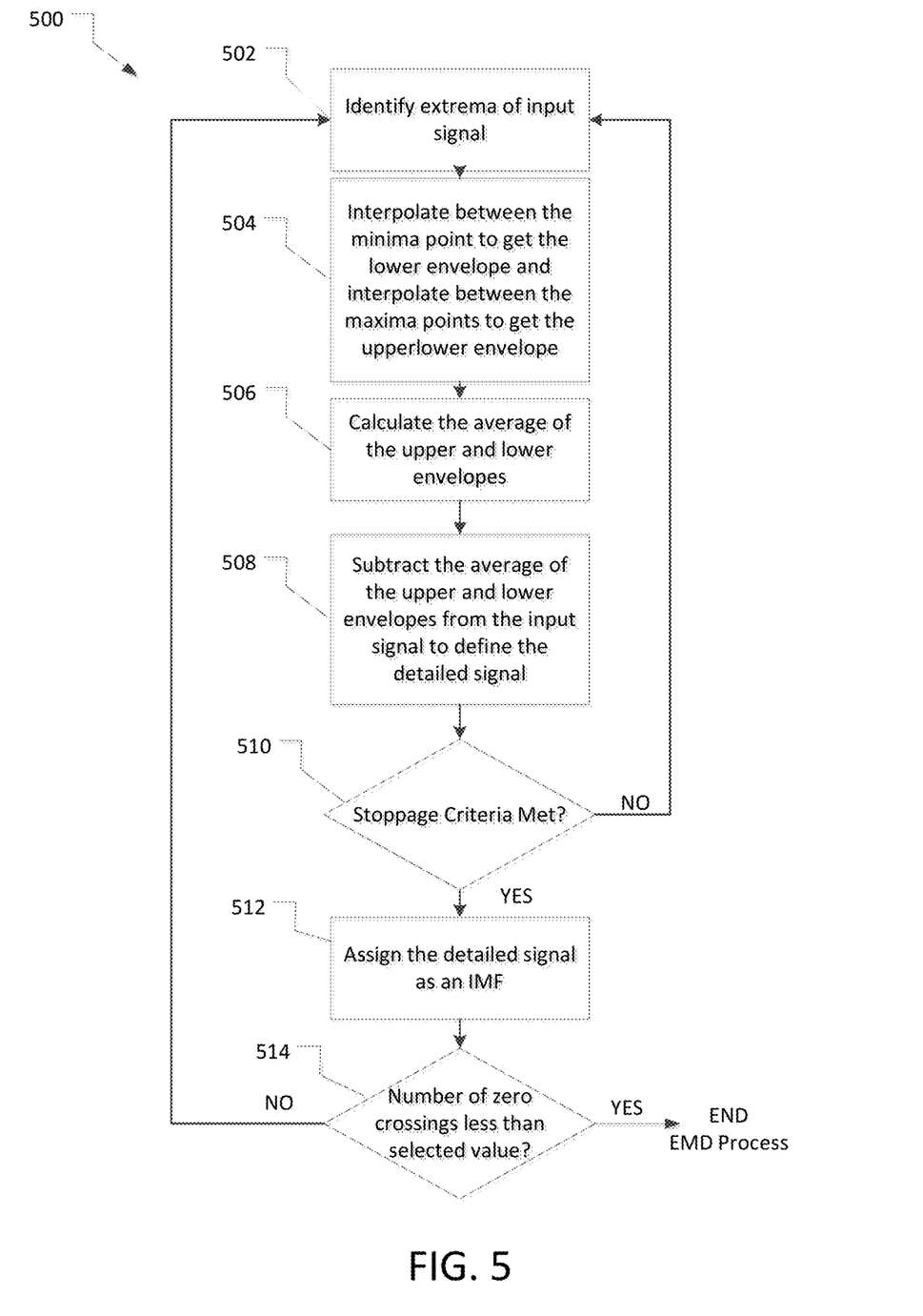
FIG. 5 is a flowchart illustrating operation of one example of an EDM process consistent with the present disclosure.

An EMD process may be implemented in a variety of ways. FIG. 5 is a flow chart illustrating one exemplary EMD process 500 useful in connection with a system and method consistent with the present disclosure. While flowcharts presented herein illustrate various operations according to example embodiments, it is to be understood that not all of the depicted operations are necessary for other embodiments. Indeed, it is fully contemplated herein that in other embodiments of the present disclosure, the depicted operations, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

In the illustrated embodiment, the EMD process may begin by identifying 502 the extrema of an input signal x(t), i.e. $x_{max}(t)$ and $x_{min}(t)$. An interpolation 504 between the minima points may be performed 504 to define a lower envelope or $e_{min}(t)$), and an interpolation between the maxima points may be performed to define an upper envelope $e_{max}(t)$. The averages of the upper and lower envelopes may then be calculated 506 as:

$$m(t) = \frac{(e_{max}(t) + e_{min}(t))}{2} \qquad \text{(equation 1)}$$

The detailed signal may then be defined as 508 as: d(t)=x(t)−m(t). If a stoppage criteria is not met 510, then the process may return to step 502 to iterate using a new input signal. If the stoppage criteria 510 has been satisfied, the detailed signal is assigned 512 as an IMF. If the number of zero crossings is less than a selected value 514, e.g. 2, then the EMD process may end, otherwise additional IMFs may be calculated, e.g. by subtracting d(t) from the input signal to define a residue and assigning the residue as a new input signal and iterating the process The stoppage criteria may be selected and/or applied in a number of ways to set the number of iterations in the EMD process. In one embodiment, the stoppage criteria may be selected to ensure that the difference between successive residue calculations is small. For example, a Cauchy convergence test may be used to determine whether the normalized squared difference between two successive residue calculations is less than a selected value, e.g. (0.2 or 0.3). If a given an input signal x(t) in any iteration satisfies the stoppage criteria and the number of extrema and zero crossings differ by one, then the input signal may be assigned as an IMF and the EMD process may end.

If a particular multi-channel bandwidth of interest is noisy, but completely unoccupied, an EMD process may produce a false positive result indicating that the bandwidth of interest includes occupied portions. Advantageously, however, it has been found that white noise processed by EMD produces monotonically decreasing IMF powers. If a multi-channel bandwidth of interest is noisy but includes occupied channels, the calculated IMF power does not monotonically decrease.

Figure 6:
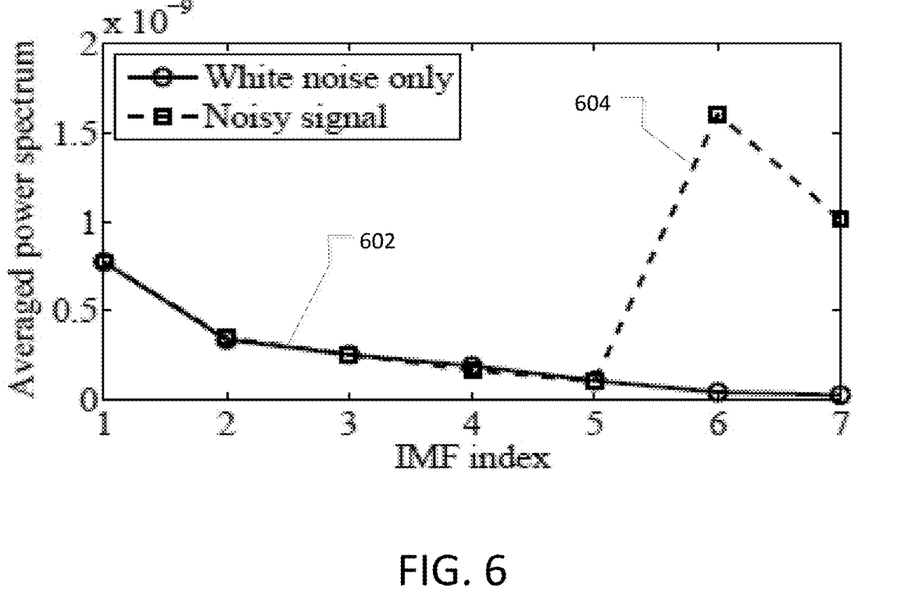
FIG. 6 includes plots of average power vs. IMF index illustrating performance of a system consistent with the present disclosure.

FIG. 6, for example, includes plots of IMF index (index 1 being the IMF associated with a first iteration, index 2 being the IMF associated with the second iteration, etc.) vs. average power. Plot 602 is associated with a white noise signal only and plot 604 is associated with a signal with noise and an SNR of −10 dB over one occupied channel. As shown in FIG. 6, the power in the IMFs associated with the white noise signal (plot 602) monotonically decreases with increasing IMF index, whereas the power in the IMFs associated with the low SNR signal (plot 604) does not monotonically decrease with increasing IMF index.

This characteristic may be exploited in a system method consistent with the present disclosure to differentiate a pure noise spectrum from a low SNR sampled bandwidth of interest. In particular, if $IMF_j > IMF_{j+1}$, $\forall j = 1 \ldots M$, (where M is the highest index of IMF of interest) then the input spectrum carries only noise and the spectrum of interest is vacant, otherwise the spectrum of interest carries an occupied channel.

Once the IMFs are calculated and the bandwidth of interest is confirmed to be either entirely vacant, i.e. the entire bandwidth may be considered available spectrum, or to include at least one occupied channel, the IMFs may be de-noised by filtering or smoothing. De-noising may be advantageous in an embodiment of a system and method consistent with the present disclosure when there is a large variation of the magnitudes of different IMFs associated with a signal. Large variations in IMF magnitudes may affect the derivation of the threshold used for detection.

To de-noise the IMFs, a filter, such as a known Savitzky-Golay (S-G) filter, or polynomial smoothing may be applied to the IMFs. An S-G filter, for example, is a generalization of a finite-impulse-response (FIR)-averaged filter with non-linear characteristics. An S-G filter may be used to reduce noise while maintaining the shape and height of the IMF waveforms. Spectral peaks in the IMFs due to the noise power may have a negative influence on the setting of the threshold. Accordingly, the frame size and the polynomial order of the S-G filter may be selected to provide smoothing of the peaks while retaining the spectral height of the IMFs. Selecting a low or high order filter with a small frame size may yield poor smoothing. However, increasing the filter order with relatively large frame size has been found to produce better smoothing and retain the spectrum height. In one embodiment, for example, it has been found that an S-G filter with a polynomial of third order and a frame size of 41 achieved a tradeoff between the IMF heights and the smoothing of the IMFs in their frequency-domain representation. The filtered IMFs can be represented as:

$$\overline{C}_i(f) = j! \sum_{m=-K}^{K} g_j(-m) \hat{C}_i^{(j)}(f-m) \quad \text{(equation 2)}$$

where $\overline{C}_i$ is the filtered signal of $i^{th}$ IMF, K is the frame size, $g_j$ is the polynomial coefficient, and j is the polynomial order.

In a system and method consistent with the present disclosure the filtered IMFs may be reconstructed and compared against the threshold. The threshold may be derived, e.g. using the filtered IMFs, in a variety of ways. In general, the threshold may be influenced directly by the noise variance and the signal. In one embodiment, the noise may be modeled as independent identically distributed additive white Gaussian noise (AWGN) with zero mean and a variance and the energy in the signal may be given by set of zero-mean IMFs that have a chi-squared distribution with 2-degrees of freedom. The data-driven threshold may be determined adaptively from the frequency-domain IMFs for the multi-channel bandwidth given that there is at least one occupied channel.

In one method of calculating a threshold useful in a system and method consistent with the present disclosure, the peak $\hat{C}m_i$ of each filtered IMF is determined from the maximum of each filtered IMF, $\overline{C}_i(f)$. The peaks $\hat{C}m_i$ are then sorted in ascending order and the lowest value, $\hat{C}m_1$, is discarded. The threshold $\lambda_d$ is then calculated according to:

$$\lambda_d = \frac{\sum_{i=2}^{M} \hat{C}m_i}{M-1} + \hat{C}m_1 \quad \text{(equation 3)}$$

where M is the highest IMF index. The value of $\hat{C}m_1$ may be discarded since it is an extremely low value. However, $\hat{C}m_1$ represents the IMF with the lowest contribution and hence may be considered as a marginal error of the calculated threshold. Therefore, $\hat{C}m_1$ may be added to the threshold to reduce the probability of false detection that might occur at very low SNR levels.

Once the threshold is determined the filtered IMFs may be reconstructed according to:

$$C_r(f) = \sum_{i=1}^{M} \overline{C}_i(f) \quad \text{(equation 4)}$$

The reconstruction of the IMFs, $C_r(f)$, is compared to the calculated threshold $\lambda_d$ to determine whether portions of the bandwidth of interest occupied or available.

Figure 7:
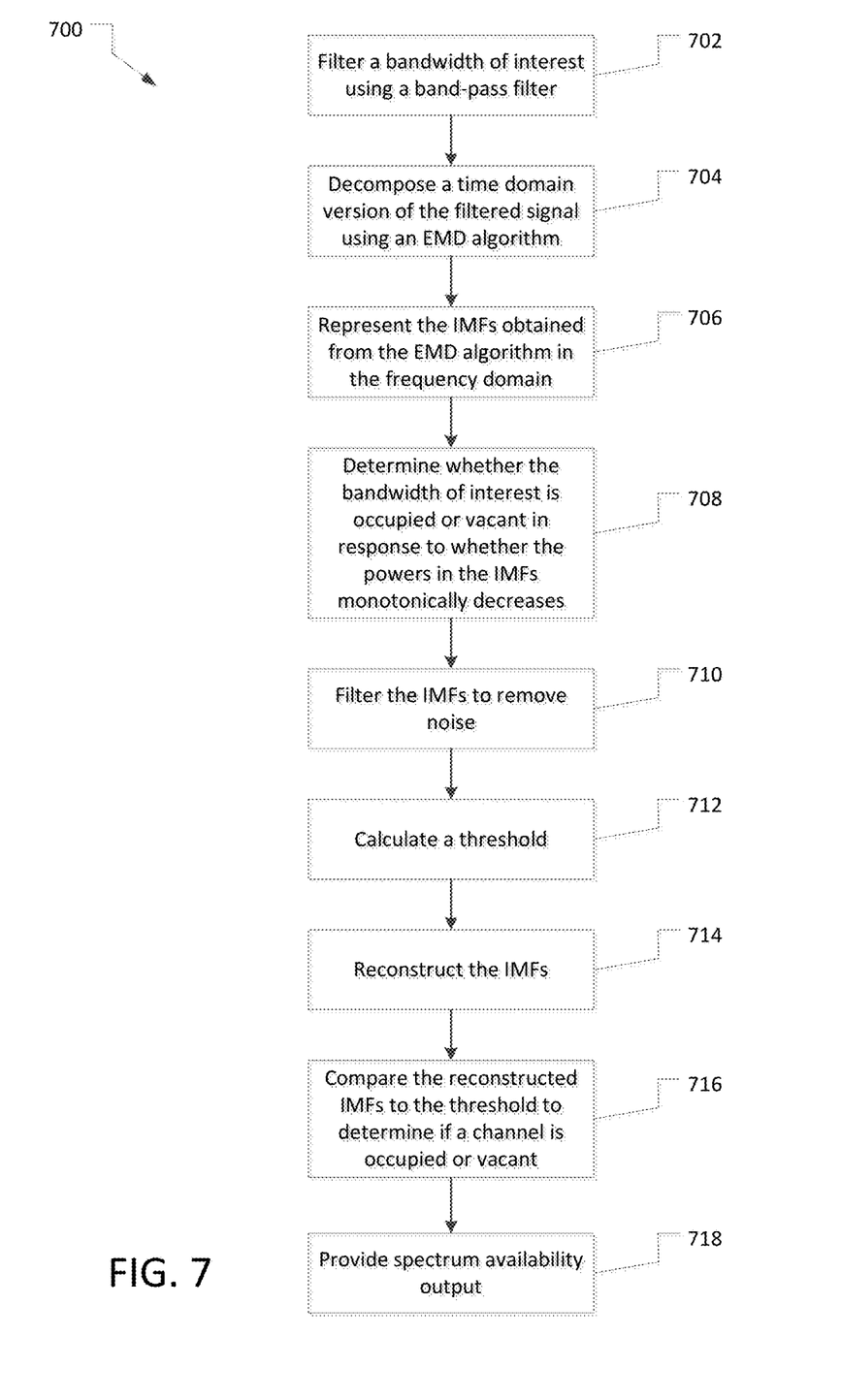
FIG. 7 is a flowchart illustrating operation of one example of a method consistent with the present disclosure.

In summary, therefore, the EMD-based energy detection circuit 308 consistent with the present disclosure may use an EMD process and a data-driven threshold to determine whether portions of a bandwidth of interest comprise available spectrum or occupied spectrum. FIG. 7 is a flow chart illustrating one exemplary embodiment 700 of an EMD-based energy detection method that may be performed by an EMD-based energy detector circuit consistent with the present disclosure. Exemplary details of the operations shown in FIG. 7 are discussed above. As shown, the method includes filtering 702 a bandwidth of interest using a band pass filter (e.g. filter 304 in FIG. 3), and then decomposing 704 a digital time domain version of the filtered output using an EMD process. The IMFs obtained using the EMD process may then be represented 706 in the frequency domain, e.g. according to:

$$\hat{C}_i(f) = \frac{1}{N} \left| \sum_{n=0}^{N-1} \left| C_i(n) e^{\frac{-2\pi i f n}{N}} \right|^2 \right. \quad \text{(equation 5)}$$

where N is number of samples of the digital time domain signal x(n), f is a number of frequency bins, and $\hat{C}_i$ is the $i^{th}$ frequency-domain IMF. The spectrum may then be determined 708 to be occupied or vacant depending on whether the power in the IMFs is monotonically decreasing, as described above. Each IMF may then be filtered 710 to remove noise, e.g. using a S-G filter of the third order, and the threshold $\lambda_d$ may be calculated 712, e.g. using equation (3). The filtered IMFs may then be reconstructed 714, e.g. according to equation (4), and the reconstructed IMFs may be compared 716 to the threshold. If any selected channel or other portion of the bandwidth of an IMF exceeds the threshold, the channel is deemed to be occupied. Otherwise, the channel or bandwidth is available spectrum that is available for use. A spectrum availability output may then be provided 718.

The spectrum availability output from the EMD-based energy detection circuit 308 (FIG. 3) may take a variety of forms, e.g. depending on the system configuration. In one embodiment, for example, the spectrum availability output may be a digital output with digits representing successive channels in a bandwidth of interest and a digital one representing an occupied channel and a digital zero representing an available channel. For the signal illustrated in FIG. 4, for example, the spectrum availability output may be a digital signal of 11011, indicating that channel C is available spectrum but channels A, B, D, and E are occupied channels.

Figure 8:
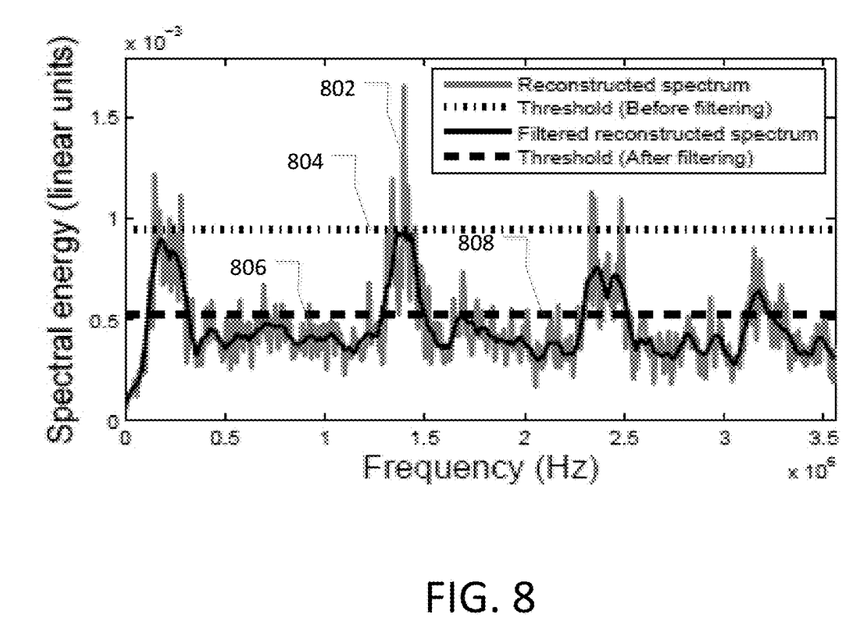
FIG. 8 includes plots of spectral energy vs. frequency illustrating performance of a system consistent with the present disclosure.

FIG. 8 includes plots of spectral energy vs. frequency illustrating operation of a system consistent with the present disclosure. The plots shown in FIG. 8 were derived using a 4-QAM time-domain signal with energy occupying four of sixteen channels covering a bandwidth of interest of 3.2 MHz. The signal was oversampled 10 times the highest frequency with a length of 20,000 samples. A flat-fading channel was assumed and the signal was contaminated with AWGN with an SNR of −10 dB. Occupied channels were placed at center frequencies of 0.2, 1.4, 2.4 and 3.2 MHz and referred to as A, B, C, and D. Plot 802 is a plot of the reconstructed IMFs before filtering and plot 804 is a plot of a threshold calculation made using the reconstructed IMFs before filtering, i.e. the IMFs shown in plot 802. Plot 806 is a plot of the reconstructed IMFs after filtering, and plot 808 is a plot of the threshold calculation made using equation (3) and the reconstructed IMFs after filtering, i.e. the IMFs shown in plot 806.

As shown in FIG. 8, the presence of noise in the unfiltered reconstructed spectrum raises the level of threshold (plot 804) and may lead to a missed detection of some channels, e.g. channel D (3.2 MHz). By de-noising the IMFs consistent with the present disclosure, e.g. using S-G filtering (plot 806), the threshold level (plot 808) correctly separates the occupied and unoccupied channels.

Figure 9:
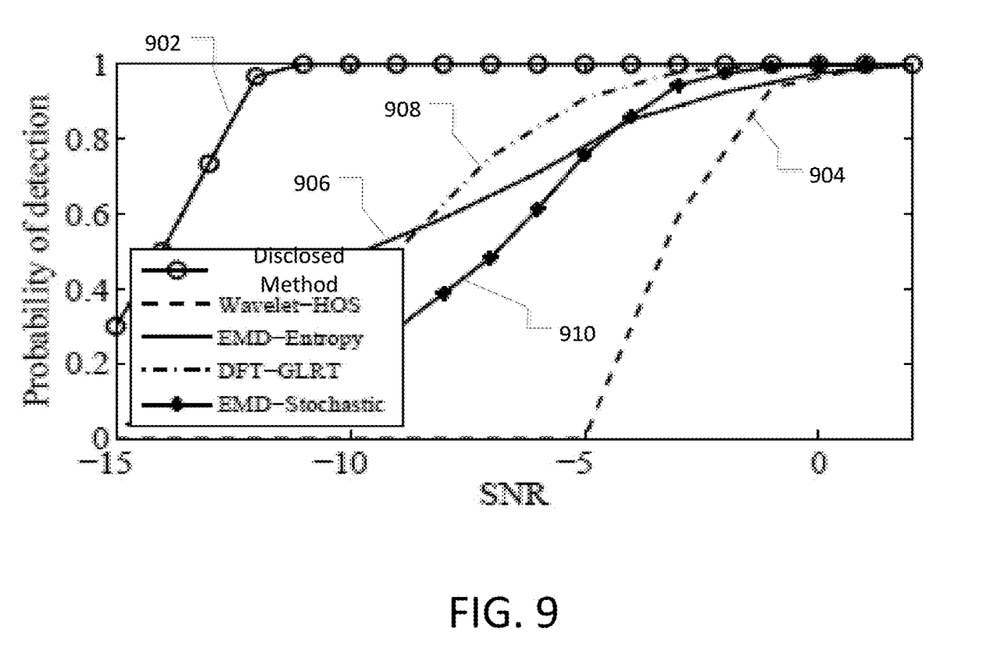
FIG. 9 includes plots of probability of detection vs. signal-to-noise ratio (SNR) illustrating performance of a system consistent with the present disclosure.

FIG. 9 includes plots of probability of detection vs. SNR illustrating performance of the system described above in connection with FIG. 8. The probability of detection was calculated according to:

$$P_D = P_r(C_r(f) > \lambda_d : H_1) \quad \text{(equation 6)}$$

where $P_D$ is the probability of detection, $P_r$ is the probability of the enclosed function, $C_r$ is received IMF at frequency f, $\lambda_d$ is threshold 712, and $H_1$ indicates that the channel is occupied. Plot 902 illustrates performance the system consistent with the present disclosure when the IMFs are filtered and the threshold is calculated according to equation (3) using filtered IMFs. Plot 904 illustrates performance of a wavelet based technique, plot 906 illustrates performance of an EMD-entropy based technique, plot 908 illustrates performance of a DFT-based technique and plot 910 illustrates performance of an EMD-stochastic technique. As shown, a system and method consistent with the present disclosure (plot 902) outperforms the other techniques and achieves a probability of detection of 96% at −12 dB. The closest performance came from the DFT approach (plot 908) with a high probability of detection at −2 dB. The wavelet approach had the lowest performance with high probability of detection at approximately 1 dB. Also, the system consistent with the present disclosure achieved gains of 11 dB and 9 dB over EMD-entropy and EMD-stochastic techniques, respectively.

A system and method consistent with the present disclosure thus achieves detection at low SNR without requiring a high level of processing compared to other methods by exploiting the ability of EMD to adaptively decompose any non-linear and non-stationary signal. The IMFs are filtered and then used to adaptively derive a threshold for determining channel occupancy without prior knowledge of the signal.

According to one aspect of the disclosure, there is thus provided a system including an empirical mode decomposition (EMD)-based receiver configured to receive a wireless signal including a bandwidth of interest and to apply an EMD process to provide a spectrum availability output, the spectrum availability output indicating which portions the bandwidth of interest are available spectrum. The system may further include a cognitive radio system configured for communication on the available spectrum in response to the spectrum availability output and/or a detection system configured to provide an alarm indicating unauthorized use of available spectrum in response in response to the spectrum availability output.

According to another aspect of the disclosure, there is provided a method of identifying available spectrum in a bandwidth of interest, the method including: receiving a signal comprising the bandwidth of interest; decomposing the bandwidth of interest into a plurality of intrinsic mode functions (IMFs) using an empirical mode decomposition (EMD) process; calculating a threshold using the IMFs; and comparing the IMFs to the threshold to determine which portions of the bandwidth of interest are available spectrum.

According to another aspect of the disclosure, there is provided a method of identifying available spectrum in a bandwidth of interest, the method including: receiving a signal comprising a bandwidth of interest; decomposing the bandwidth of interest into a plurality of intrinsic mode functions (IMFs) using an empirical mode decomposition (EMD) process; determining whether the bandwidth of interest comprises occupied spectrum in response to whether the IMFs are monotonically decreasing in power; filtering the IMFs to remove noise from the IMFs and to produce filtered IMFs; calculating a threshold using the filtered IMFs; and comparing the IMFs to the threshold to determine which portions of the bandwidth of interest are available spectrum.

Embodiments of the methods described herein may be implemented using a processor and/or other programmable device. To that end, the methods described herein may be implemented on a tangible, computer readable storage medium having instructions stored thereon that when executed by one or more processors perform the methods. Thus, for example, the transmitting and/or receiving terminal may include a storage medium (not shown) to store instructions (in, for example, firmware or software) to perform the operations described herein. The storage medium may include any type of non-transitory tangible medium, for example, any type of disk including floppy disks, optical disks, compact disk read-only memories (CD-ROMs), compact disk re-writables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

It will be appreciated by those skilled in the art that any block diagrams herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

As used in any embodiment herein, "circuit" or "circuitry" may comprise, for example, singly or in any combination, hardwired circuitry, programmable circuitry, state machine circuitry, and/or firmware that stores instructions executed by programmable circuitry. In at least one embodiment, the transmitter and receiver may comprise one or more integrated circuits. An "integrated circuit" may be a digital, analog or mixed-signal semiconductor device and/or microelectronic device, such as, for example, but not limited to, a semiconductor integrated circuit chip. The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. As used herein, use of the term "nominal" or "nominally" when referring to an amount means a designated or theoretical amount that may vary from the actual amount.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A system comprising:
an empirical mode decomposition (EMD)-based energy detector configured to receive a signal comprising a bandwidth of interest and to apply an EMD process to provide a spectrum availability output, the spectrum availability output indicating which portions of the bandwidth of interest are available spectrum, wherein the EMD process further comprises determining if the bandwidth of interest comprises occupied spectrum by determining whether intrinsic mode functions (IMFs) generated by the EMD process are monotonically decreasing in power.

2. The system of claim 1, the system further comprising a cognitive radio system configured for communication on the available spectrum in response to the spectrum availability output.

3. The system of claim 1, the system further comprising a detection system configured to provide an alarm indicating unauthorized use of available spectrum in response to the spectrum availability output.

4. The system of claim 1, wherein the EMD-based receiver is further configured to determine a threshold using intrinsic mode functions (IMFs) generated by the EMD process, and to compare the IMFs to the threshold to determine which portions of the bandwidth of interest are the available spectrum.

5. The system of claim 4, wherein the EMD-based receiver is further configured to filter the IMFs generated by the EMD process before determining the threshold.

6. The system of claim 4, wherein the EMD-based receiver is further configured to reconstruct the IMFs before comparing the IMFs to the threshold.

7. The system of claim 1, wherein the bandwidth of interest is a multi-channel bandwidth comprising at least a first channel and a second channel, the first channel being different from the second channel.

8. The system of claim 7, wherein the portions of the bandwidth of interest indicated as available in the spectrum availability output correspond to the first channel.

9. A method of identifying available spectrum in a bandwidth of interest, the method comprising:
receiving a signal comprising the bandwidth of interest;
decomposing the bandwidth of interest into a plurality of intrinsic mode functions (IMFs) using an empirical mode decomposition (EMD) process;
calculating a threshold using the IMFs; and
comparing the IMFs to the threshold to determine which portions of the bandwidth of interest are available spectrum.

10. The method of claim 9 further comprising filtering the IMFs to remove noise from the IMFs before calculating the threshold using the IMFs.

11. The method of claim 9 further comprising reconstructing the IMFs and wherein comparing the IMFs to the threshold comprises comparing the reconstructed IMFs to the threshold.

12. The method of claim 9 further comprising determining whether the bandwidth of interest comprises occupied spectrum in response to whether the IMFs are monotonically decreasing in power.

13. The method of claim 9 further comprising providing a spectrum availability output, the spectrum availability output comprising a signal representative of which portions of the bandwidth of interest are available spectrum.

14. A method of identifying available spectrum in a bandwidth of interest, the method comprising:
receiving a signal comprising the bandwidth of interest;
decomposing the bandwidth of interest into a plurality of intrinsic mode functions (IMFs) using an empirical mode decomposition (EMD) process;
determining whether the bandwidth of interest comprises occupied spectrum in response to whether the IMFs are monotonically decreasing in power;
filtering the IMFs to remove noise from the IMFs and to produce filtered IMFs calculating a threshold using the filtered IMFs; and
comparing the IMFs to the threshold to determine which portions of the bandwidth of interest are available spectrum.

15. The method of claim 14 further comprising reconstructing the IMFs and wherein comparing the IMFs to the threshold comprises comparing the reconstructed IMFs to the threshold.

16. The method of claim 14 further comprising providing a spectrum availability output, the spectrum availability output comprising a signal representative of which portions of the bandwidth of interest are available spectrum.

\* \* \* \* \*